No. 870,039. PATENTED NOV. 5, 1907.
G. M. LEASE.
TIRE BENCH.
APPLICATION FILED DEC. 15, 1906.
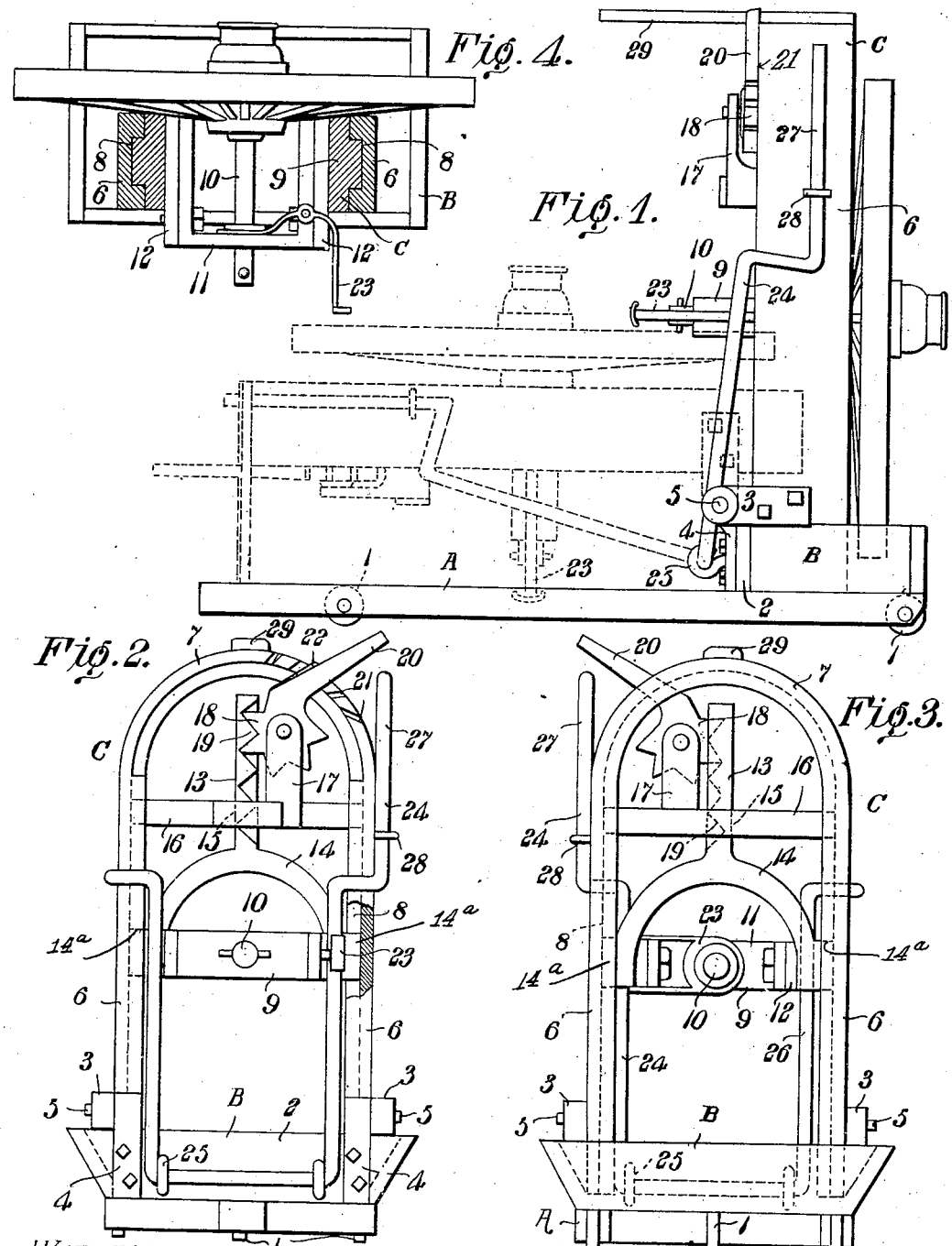
WITNESSES:
George M. Lease, INVENTOR
By C. A. Snow & Co.
ATTORNEYS

UNITED STATES PATENT OFFICE.

GEORGE M. LEASE, OF LAMAR, MISSOURI.

TIRE-BENCH.

No. 870,039.     Specification of Letters Patent.     Patented Nov. 5, 1907.

Application filed December 15, 1906. Serial No. 348,079.

*To all whom it may concern:*

Be it known that I, GEORGE M. LEASE, a citizen of the United States, residing at Lamar, in the county of Barton and State of Missouri, have invented a new and useful Tire-Bench, of which the following is a specification.

This invention relates to a machine designed for use by wheelwrights and blacksmiths for shrinking tires on the fellies of wheels, and it relates more particularly to a machine of that type in which the wheel supporting frame is hingedly mounted on the water containing trough so as to be held upright thereon to immerse the tire in the water or swung down to a horizontal position so as to be used as a bench on which the wheel is supported during the placing of the hot tire thereon and when placing the tire bolts in the wheel.

The invention has for one of its objects to improve and simplify the construction and operation of apparatus of this character so as to be of strong and durable form, conveniently manipulated, and thoroughly reliable and efficient in use.

A further object of the invention is to provide a readily portable machine including a supporting base for the trough and a wheel supporting frame hinged on the trough so as to be movable with the latter by means of the supporting base.

Another object of the invention is to provide a wheel carrying spindle on the supporting frame in connection with a treadle device whereby the spindle can be raised to lift the wheel off the supporting frame when the latter is used as a bench so that the wheel can be swung around to bring different parts thereof to the operator and thus obviate the necessity of his walking entirely around the wheel, as, for instance, in the process of inserting the tire bolts.

With these objects in view, and others, as will appear as the nature of the invention is better understood, the invention comprises the various novel features of construction and arrangement of parts, to be more fully described hereinafter and set forth with particularity in the claims appended hereto.

In the accompanying drawing, which illustrates one of the embodiments of the invention, Figure 1 is a side elevation of the machine showing the wheel supporting frame in two positions by full and dotted lines. Fig. 2 is a rear elevation of the machine. Fig. 3 is a front view thereof. Fig. 4 is a transverse section of the wheel supporting frame.

Corresponding parts in the several figures are indicated throughout by similar characters of reference.

Referring to the drawing, A designates the base of the machine, B the trough supported on one end thereof, and C the wheel supporting frame hingedly mounted on the trough. The base A is a frame of triangular, rectangular, or other suitable form, and of sufficient length to permit the upper end of the frame C to be supported on the end opposite from the trough. Adjacent the ends of the base A are rollers 1 whereby the machine can be conveniently wheeled from place to place. The trough B is of any suitable construction and arranged with its length transverse to the longitudinal dimension of the base A. The lower end of the frame C is supported on the rear wall 2 of the trough by the members 3 and 4 secured, respectively, to the frame and trough and connected by the pintles 5, thereby forming hinges. The lower end of the frame C is adapted to move into and out of the trough and coöperates with the rear wall 2 of the latter to support the frame in an upright position, during the process of cooling the tire of the wheel.

The wheel supporting frame C comprises a pair of spaced uprights 6 connected at their upper ends by the arch 7. To the lower end of these uprights, the members 3 of the hinges are secured. On the inner opposed faces of the uprights are longitudinal grooves 8 forming guideways for the ends $14^a$ of a longitudinally movable arched support 14, to the inner faces of which are attached plates 12 extending rearwardly therefrom which form brackets for an adjustable cross head 9 mounted thereon and secured by bolts $9^a$. The said cross head comprises two parallel side plates connected at their rear ends by a plate 11; a spindle 10 is centrally mounted in said plate 11 and extends forwardly between the side plates of the cross-head to receive the hub of a wheel. The cross head 9 is adapted to be adjusted vertically by means of a rack bar 13, attached to the top of the arched support and guided in an opening 15 in the cross bar 16 arranged between and secured to the upper ends of the uprights 6. Mounted on the cross bar 16, by means of the bracket 17, is a toothed member or pinion 18 which meshes with the teeth 19 of the rack bar and is provided with an operating handle 20. By raising or depressing the handle 20, the cross head is lowered or raised to any desired position. On the rear side of the arch 7 are provided notches 21 in which the tooth or projection 22 on the operating lever is adapted to engage, so as to hold the latter stationary and thereby maintain the cross head in any desired position.

The spindle 10 is mounted in the cross head 9 to have a certain amount of longitudinal movement for the purpose of permitting the wheel supported on the spindle to be raised from the frame C when the latter is in the dotted line position shown in Fig. 1, so that the wheel can be freely turned by the blacksmith to permit him to work on any point of the wheel without changing his position. To raise the spindle, a treadle 23 is mounted on the cross head and connected with the spindle so that if the treadle is depressed, the spindle will be raised.

For conveniently swinging the frame C from one position to the other, the lifting lever 24 is provided, the same comprising a U-shaped structure made of bar metal and pivoted at its lower end in the eyes 25 extending rearwardly from the back of the trough B. The upright arms 26 of the lever are bent laterally adjacent their upper ends and then forwardly to engage on the outside of the upright 6. One of the arms 26 is prolonged to form a handle 27 which is stapled, or otherwise secured, at 28 to the frame C. Thus, by taking hold of the handle 27, the wheel supporting frame C can be raised or lowered about its hinges. On the upper end of the frame C is a leg 29 which rests at its lower end on the rear portion of the base A when the frame is in the dotted line position, so as to be used as a bench.

From the foregoing description, taken in connection with the accompanying drawings, the advantages of the construction and of the method of operation will be readily understood by those skilled in the art to which the invention appertains, and while I have described the principle of operation of the invention, together with the apparatus which I now consider to be the best embodiment thereof, I desire to have it understood that the apparatus shown is merely illustrative, and that various changes may be made when desired, as are within the scope of the claims.

What I claim is:—

1. In an apparatus of the class described the combination of a trough, a wheel supporting frame, a cross head movable longitudinal of said frame, and a spindle supported on the cross head and movable therewith and adapted also to be moved in a direction transverse to its first mentioned movement.

2. In an apparatus of the class described the combination of a trough, a wheel supporting frame, a cross head support movable longitudinally thereon, an adjustable cross head carried by said support, a wheel carrying spindle on said cross head and movable also in a direction transverse that of said support.

3. In an apparatus of the class described, the combination of a trough, a wheel supporting frame, a cross head support mounted thereon, means for moving said support longitudinally of said frame, a cross head adjustably attached to said support, a spindle carried by said cross head, and means for moving said spindle in a direction transverse to that of said support, whereby the wheel may be raised above said frame or lowered thereon.

4. In an apparatus of the class described, the combination of a trough, a wheel supporting frame hinged thereto, a longitudinally movable cross head support, a transversely adjustable cross head mounted thereon, a transversely movable spindle carried by said cross head and means for moving said spindle.

5. In an apparatus of the class described, the combination of a trough, a wheel supporting frame, a cross head support slidably mounted in said frame, rearwardly projecting plates on said support, a cross head adjustably secured to said plate, a wheel spindle slidable in said cross head and a treadle adapted to move said spindle.

6. In an apparatus of the class described, the combination of a trough, a wheel supporting frame hinged thereto, a support movable longitudinally of said frame, a cross head slidable on said support, a wheel carrying spindle attached to said cross head, and means for sliding said cross head axially of the spindle.

7. In an apparatus of the class described, the combination of a trough, a wheel supporting frame hinged thereto, and an operating lever pivoted to said trough between and below its hinged connection to said frame and extending longitudinally of said frame on its rear side for a suitable distance and then turned and carried onwardly at the side of said frame and through a guide thereon.

8. In an apparatus of the class described, the combination of a trough, a wheel supporting a frame hinged thereto, a U-shaped operating lever pivoted to said trough between and below its hinged connection to said frame, the arms of said lever extending longitudinally of said frame on its rear side for a suitable distance and are then turned to opposite sides thereof, one of said arms being continued along the side of said frame to form a handle, and a guide on said frame for said handle.

In testimony that I claim the foregoing as my own, I have hereto affixed my signature in the presence of two witnesses.

GEORGE M. LEASE.

Witnesses:
C. W. RADDATZ,
J. CAMPBELL.